(12) United States Patent
Wojciechowski et al.

(10) Patent No.: US 7,212,118 B1
(45) Date of Patent: May 1, 2007

(54) PLUGGABLE CARTRIDGE MEMORY CHIP AND MEMORY ACCESS

(75) Inventors: Matthew P. Wojciechowski, Westminster, CO (US); Howard Hayakawa, Lafayette, CO (US); James C. Cates, Superior, CO (US); Gary Francis, Westminster, CO (US); William T. Veno, Thornton, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/746,064

(22) Filed: Dec. 26, 2003

(51) Int. Cl.
*G08B 13/14* (2006.01)

(52) U.S. Cl. .............. 340/572.1; 340/572.8; 360/134

(58) Field of Classification Search ......... 340/572.1, 340/572.8, 572.7; 343/720; 235/381, 487; 360/134, 69; 206/313, 807; 242/348, 344
See application file for complete search history.

(56) References Cited

U.S. PATENT DOCUMENTS

| | | | | |
|---|---|---|---|---|
| 4,857,890 | A | * | 8/1989 | Solow .................. 340/479 |
| 5,218,342 | A | * | 6/1993 | McCrackin .......... 340/572.8 |
| 5,237,307 | A | * | 8/1993 | Gritton ................. 340/572.1 |
| 5,424,526 | A | | 6/1995 | Leonhardt et al. |
| 5,971,281 | A | | 10/1999 | Frary et al. |
| 6,081,857 | A | | 6/2000 | Frary |
| 6,201,474 | B1 | | 3/2001 | Brady et al. |
| 6,226,688 | B1 | | 5/2001 | Frary |
| 6,304,416 | B1 | | 10/2001 | McAllister et al. |
| 6,466,990 | B2 | | 10/2002 | Frary |
| 6,614,750 | B2 | * | 9/2003 | Weber et al. ............ 720/718 |
| 6,865,047 | B2 | * | 3/2005 | Maekawa et al. ........ 360/69 |

* cited by examiner

*Primary Examiner*—Anh V. La
(74) *Attorney, Agent, or Firm*—Brooks Kushman P.C.

(57) ABSTRACT

A cartridge system uses a pluggable remotely accessible tag to store information related to the cartridge. These tags may be accessed by tape drives having pluggable remotely accessing receivers.

14 Claims, 4 Drawing Sheets

PLUGGABLE CARTRIDGE MEMORY CHIP AND MEMORY ACCESS

BACKGROUND OF THE INVENTION

1. Field of the Invention

The present invention relates to storing and accessing information about tape cartridges.

2. Background Art

Tape is a practical and economic means for long term data storage. Typically, tape is constructed with a flexible web onto which is placed one or more coatings susceptible to changes in magnetic fields, light, and the like. This tape is stored in a cartridge having one or two reels about which the tape is wound. The cartridge is inserted into a tape drive for writing to or reading from the data tape. Typically, the cartridge has an access door which is opened when the cartridge is inserted into the tape drive. For single hub cartridges, the tape is withdrawn from the cartridge and pulled along a tape path which includes at least one tape access head. When access is completed, the tape is rewound into the cartridge. If the cartridge includes two hubs, the tape is wound between these hubs within the cartridge. The tape may be pulled from the cartridge through the access door or a tape head may be inserted into the cartridge through the access door. A cartridge containing two hubs is sometimes referred to as a cassette.

It is often important to record information about each tape cartridge. One type of information concerns the data stored on the tape held within the cartridge. This information can include, for example, a list of files stored on the tape, the time and date at which data was stored, one or more expiration dates, file ownership information, and the like. Another type of information describes the cartridge itself. For example, the cartridge may have a serial number or other identifier. This type of information can also include a descriptor of the type of cartridge, type of tape, cartridge manufacturer information, and the like. Yet another type of information is related to how the cartridge has been used. This information can include, for example, the number of times the cartridge has been loaded into a tape deck, the number of cartridge read and/or write operations, the age of the cartridge, access error data, and the like.

One technique for holding cartridge information is to include a radio frequency tag or transponder on the cartridge. This transponder includes memory holding the data of interest. This data can be accessed by a radio frequency reader when the tag is placed in proximity to the reader. Examples of radio frequency tags and radio frequency readers for use in tape cartridges are provided in U.S. Pat. Nos. 5,971,281; 6,081,857; 6,226,688; and 6,466,990; each of which is herein incorporated by reference.

One disadvantage of previous systems is that radio frequency tags and radio frequency readers are permanently affixed to cartridges and tape decks, respectively. Thus, as technology improves or customer requirements are changed, there is no ability to easily upgrade cartridges and tape drives.

SUMMARY OF THE INVENTION

The present invention includes a cartridge system using pluggable remotely accessible tags. These tags may be accessed by tape drives having pluggable remotely accessing receivers.

The present invention provides a cartridge including a housing. At least one hub is rotably mounted within the housing. A length of data tape is wound around the hub. A remotely accessible tag is removably affixed to the housing. The remotely accessible tag stores data related to the cartridge. The remotely accessible tag is readable by a remotely accessing reader placed in close proximity to the remotely accessible tag.

In an embodiment of the present invention, the housing defines an access door. The remotely accessible tag is affixed to the access door. This may be accomplished, for example, by fitting the tag into tabs mounted on an inside surface of the access door.

In another embodiment of the present invention, the housing defines a slot into which the remotely accessible tag is inserted. The remotely accessible tag may be affixed to a carrier having at least one tab which snaps into a mating region of the slot.

In still another embodiment of the present invention, the remotely accessible tag may be written to as well as read from.

A system is also provided. The system includes a cartridge encasing a length of data tape and a remotely accessible tag. The remotely accessible tag is removably affixed to the data cartridge. The system also includes a tape drive for receiving the cartridge and accessing the magnetic tape. The tape drive has a remotely accessing receiver positioned such that, when the cartridge is inserted into the tape drive, the remotely accessing receiver can read data from the remotely accessible tag. In an embodiment of the present invention, the remotely accessing receiver is electrically connected to a printed circuit board pluggably removable from the tape drive.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
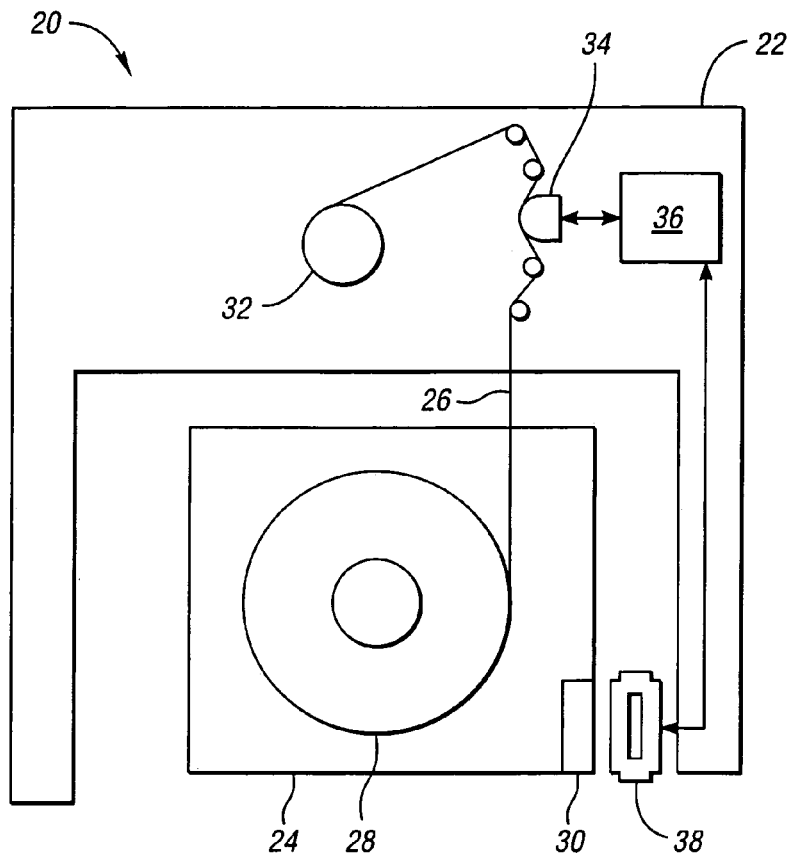
FIG. 1 is a block diagram illustrating a pluggable cartridge data system according to an embodiment of the present invention.

Referring to FIG. 1, a block diagram illustrating a pluggable cartridge data system according to an embodiment of the present invention is shown. A tape access system, shown generally by 20, includes tape drive 22 and tape cartridge 24. Data tape 26 is wound around cartridge hub 28 in tape cartridge 24. Data tape 26 may be magnetic tape, optical tape, or the like, and may have any width or length. Data may be held on tape 26 in one or more data tracks written linearly, obliquely, or in any other manner. Tape cartridge 24 also includes a remotely accessible tag such as radio frequency tag 30 storing data related to cartridge 24.

Tape drive 22 includes drive hub 32 about which tape 26 is wound as tape 26 is unwound from cartridge 24. Tape 26 is moved past tape head 34 operative to write data onto an read data from tape 26. Tape access head 34 communicates with control logic 36. Control logic 36 generates write signals, receives read signals, positions tape head 34, and controls motors for driving hubs 28, 32. Control logic 36 receives data from and sends data to a remotely accessing reader such as radio frequency reader 38. When cartridge 24 is inserted into tape drive 22, radio frequency reader 38 can read data from radio frequency tag 30 and, preferably, write data to radio frequency tag 30.

A wide variety of data may be stored by radio frequency tag 30. Radio frequency tag 30 may hold the number of times cartridge 24 is loaded into tape drive 22. Radio frequency tag 30 may record the number of write operations and/or read operations performed by tape access head 34. Radio frequency tag 30 may hold a table of contents of data stored on tape 26. Such a table of contents can include file names, file references, file ownership and accessibility information, date of file creation, file version, date on which file was written to tape 26, file backup information, and the like. Radio frequency tag 30 may also contain metadata permitting data use and/or analysis separate from an application creating the data stored on tape 26. Radio frequency tag 30 may hold manufacturer's data for cartridge 24 and/or tape 26 including cartridge type, tape type, creation date, lot information, and the like. Radio frequency tag 30 can hold data or a subset of data normally contained in the media information region of tape 26. Radio frequency tag 30 may also include ownership, control and/or access information for cartridge 24. As will be recognized by one of ordinary skill in the art, the type of information held by radio frequency tag 30 and accessed by radio frequency reader 38 is not limited by the present invention.

Tape deck 22 is constructed to operate effectively without either or both of radio frequency tag 30 and radio frequency reader 38. This permits a base level cartridge 24 and tape drive 22 without the ability to store cartridge information. Pluggable radio frequency tag 30 and pluggable radio frequency reader 38 provide the customer with the ability to add cartridge data storage after initial equipment purchase. Further, since both radio frequency tags 30 and radio frequency reader 38 are removable, the customer can upgrade when improved versions of radio frequency tag 30 and/or radio frequency reader 38 become available.

Another benefit is that the pluggable feature of radio frequency tag 30 permits easy replacement of a defective tag in the cartridge. This is important if, for example, radio frequency tag 30 becomes defective after the customer has stored a large amount of data on cartridge 24. Similarly, the pluggable nature of radio frequency reader 38 permits easy replacement of a defective reader in tape deck 22. Easy replacement facilitates rapid repair of tape deck 22 during manufacture or in the field.

Figure 2A:
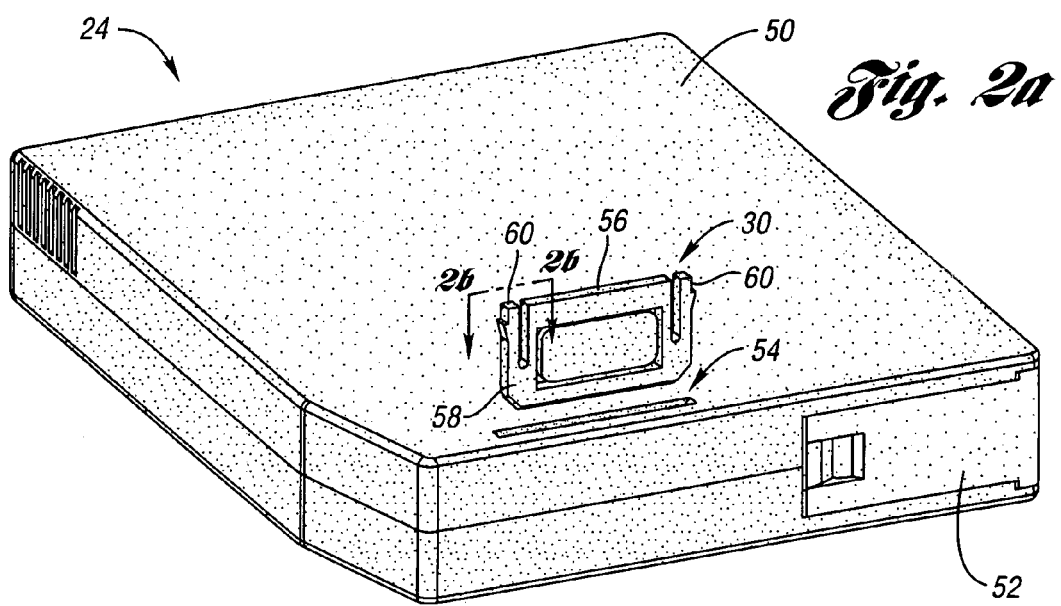
FIGS. 2*a* and 2*b* are schematic diagrams illustrating a cartridge with a slot for receiving a pluggable radio frequency tag according to an embodiment of the present invention.
Figure 2B:
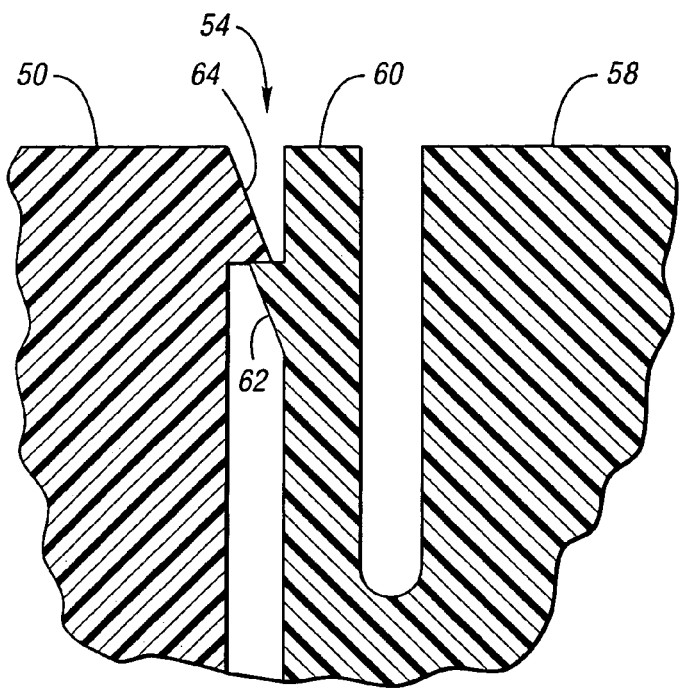

Referring now to FIGS. 2a and 2b, schematic diagrams illustrating a cartridge with a slot for receiving a pluggable radio frequency tag according to an embodiment of the present invention are shown. Cartridge 24 includes housing 50 typically made of plastic or another material substantially transparent to radio frequency signals. Housing 50 includes access door 52 which opens to provide access to tape held within cartridge 24. Housing 50 defines slot 54 for receiving radio frequency tag 30.

Radio frequency tag 30 includes radio frequency transponder 56 held by carrier 58. Carrier 58 includes flexing tabs 60 for holding radio frequency tag 30 within slot 54.

Referring now to FIG. 2b, a cut view of cartridge 24 illustrates how radio frequency tag 30 is held within slot 54. Each tab 60 includes sloped ridge 62 which flexes tab 60 as sloped ridge 62 contacts protruding portion 64 of housing 50. When radio frequency tag 30 is fully inserted into slot 54, tag 60 passes protruding portion 64 and pushes outward so that protruding portion 64 holds sloped ridge 62 in place.

Radio frequency tag 30 can be removed from slot 54 by compressing tabs 60 towards the center of carrier 58. This allows sloped ridges 62 to slide past corresponding protruding portions 64 of housing 50.

Figure 3:
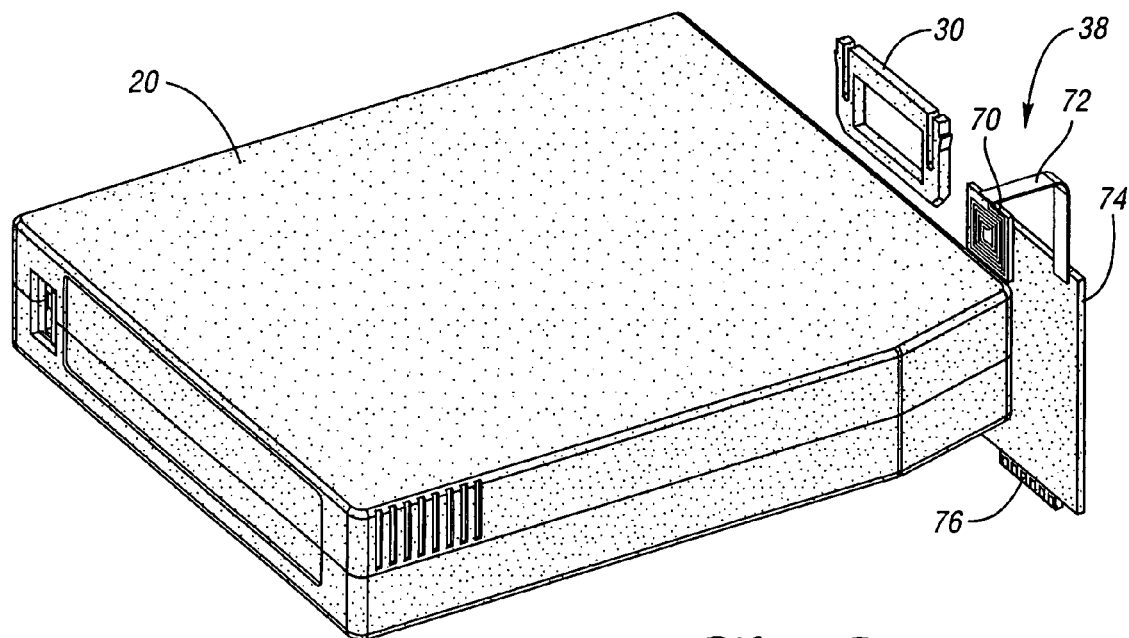
FIG. 3 is a schematic diagram illustrating a pluggable radio frequency reader according to an embodiment of the present invention.

Referring now to FIG. 3, a schematic diagram illustrating a pluggable radio frequency reader according to an embodiment of the present invention is shown. A radio frequency reader, shown generally by 38, includes antenna 70 for communicating with radio frequency tag 30. Flexible cable 72 connects antenna 70 with printed circuit board 74 containing electronics implementing radio frequency reader 38. Printed circuit board 74 may also include electronics permitting antenna 70 to transmit to, and thereby store data in, radio frequency tag 30. Printed circuit board 74 includes pluggable interface 76 allowing printed circuit board 74 to be easily inserted into and removed from tape drive 22.

Figure 4:
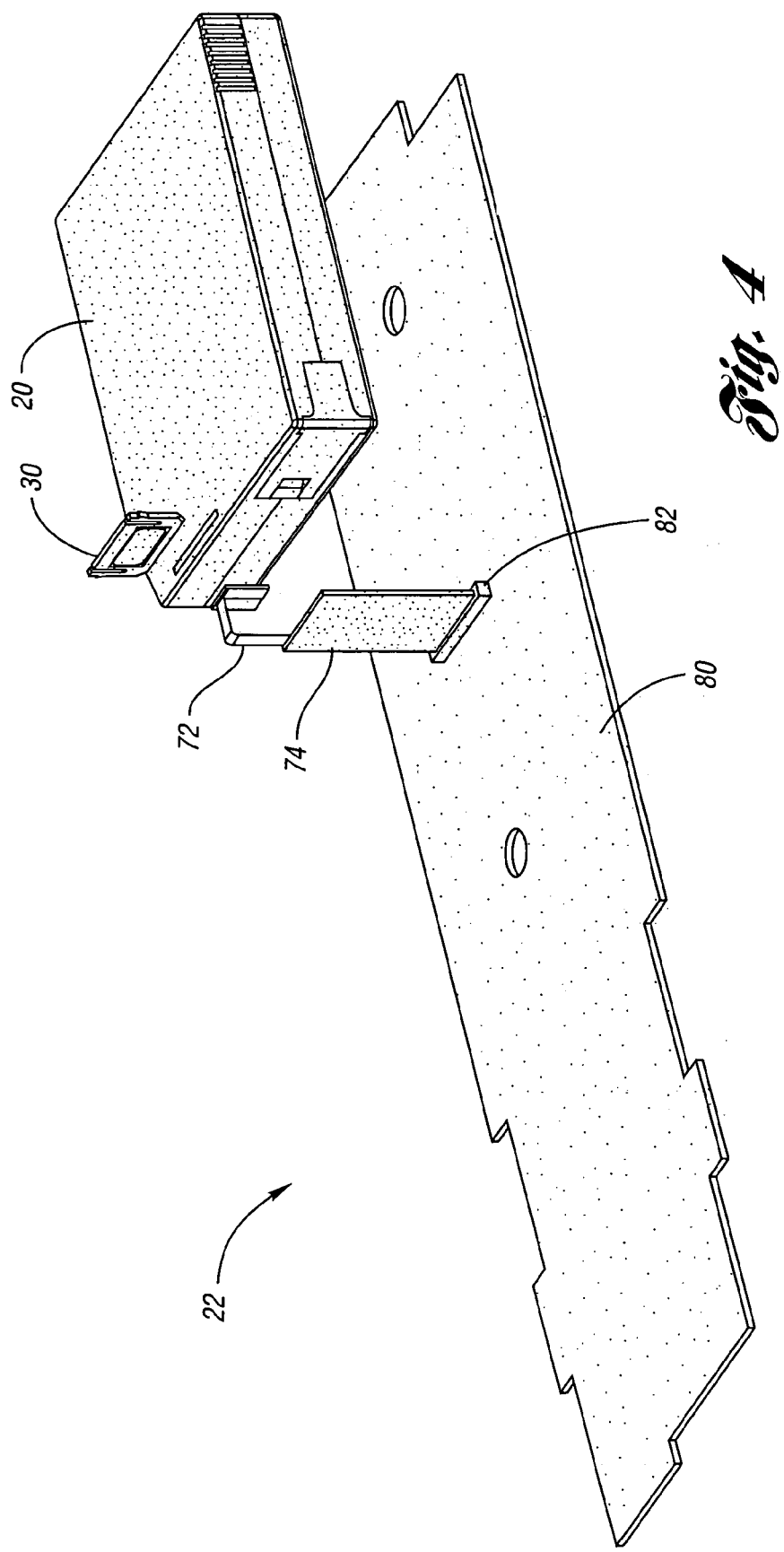
FIG. 4 is a schematic diagram illustrating a pluggable reader inserted into a tape drive according to an embodiment of the present invention.

Referring now to FIG. 4, a schematic diagram illustrating a pluggable reader inserted into a tape drive according to an embodiment of the present invention is shown. Tape drive 22 includes printed circuit board 80 holding electronics implementing control logic 36, not shown for clarity. Printed circuit board 80 includes connector 82 for receiving remotely accessing receiver printed circuit board 74. Connector 82 provides electrical connectivity and mechanical support for printed circuit board 74. Various such connectors 82 are known in the art.

Preferably, either or both of radio frequency tag 30 and radio frequency reader 38 include version numbers. These version numbers are passed by radio frequency reader 38 to control logic 36 or other logic, allowing tape deck 22 to detect the versions of radio frequency tag 30 and radio frequency reader 38. Software in tape deck 22 can use the version information to determine whether or not radio frequency tag 30 and/or radio frequency reader 38 are present, what type of cassette information is held in radio frequency tag 30, whether radio frequency tag 30 can be written to or not, and the like.

Figure 5:
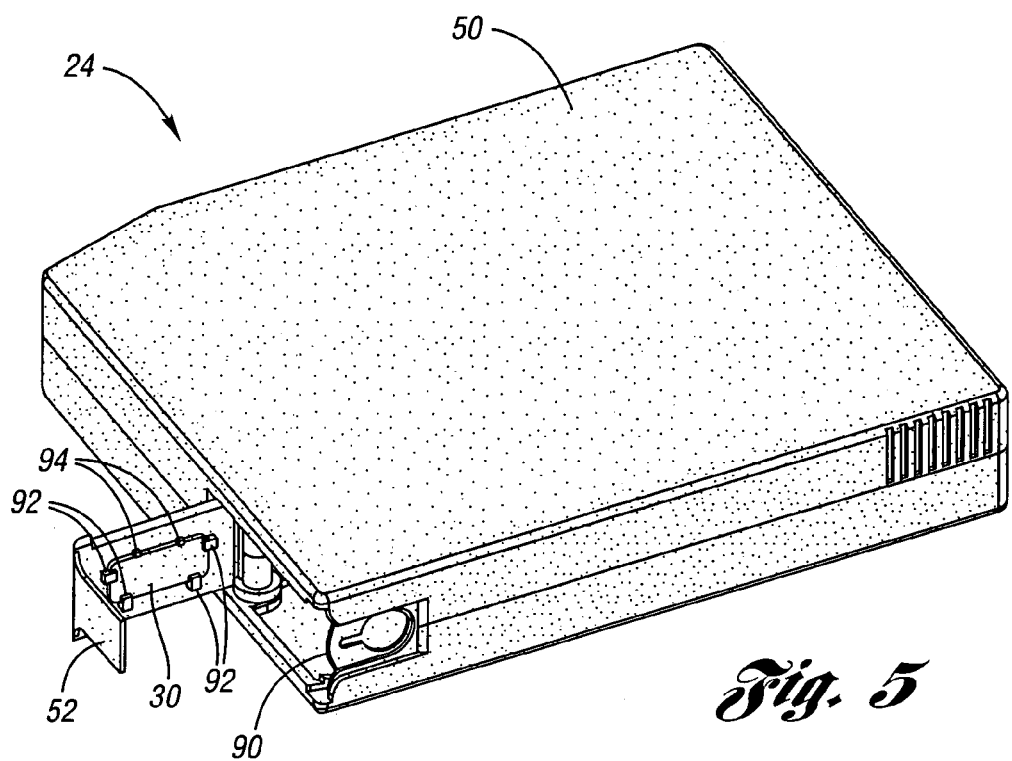
FIG. 5 is a schematic diagram illustrating a radio frequency tag affixed to a cartridge access door according to an embodiment of the present invention.

Referring now to FIG. 5, a schematic diagram illustrating a radio frequency tag affixed to a cartridge access door according to an embodiment of the present invention is shown. Access door 52 of housing 50 is open, providing access to tape leader 90. Radio frequency tag 30 is mounted on an inside surface of access door 52 such that, when access door 52 is closed, radio frequency tag 30 is protected within cartridge 24.

Radio frequency tag 30 is held to access door 52 by tabs 92, 94. Radio frequency tag 30 is slid over tabs 94 and into tabs 92 and then snapped against tabs 94 when inserted. To remove radio frequency tag 30, the top of radio frequency tag 30 is pulled away from tabs 94 and then radio frequency tag 30 is slid out of tabs 92.

Figure 6:
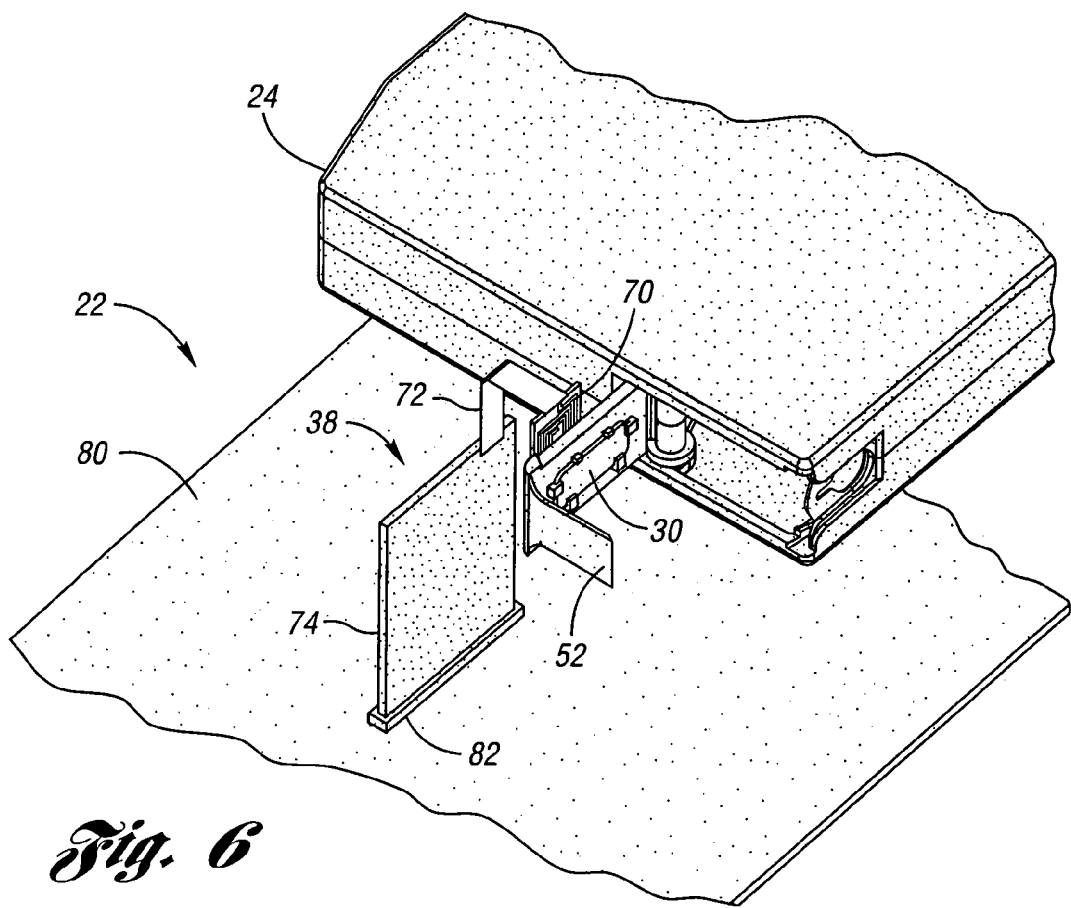
FIG. 6 is a schematic diagram illustrating a pluggable reader accessing the radio frequency tag of FIG. 5.

Referring now to FIG. 6, a schematic diagram illustrating a pluggable reader accessing the radio frequency tag of FIG. 5 is shown. Remotely accessing receiver printed circuit board 74 is plugged into connector 82 on tape drive printed circuit board 80 such that antenna 70 is positioned near radio frequency tag 30 when cartridge 24 is inserted into tape drive 22 and access door 52 is open. This allows radio frequency tag 30 to be written to and read from by radio frequency receiver 38.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, a radio frequency tag is described in the preferred embodiment. However, communication with the tag can be accomplished in one or more of a wide variety of techniques, including magnetic, electrical, optical, electromagnetic, and the like. The present invention has been described for use in a cartridge, but one of ordinary skill in the art will recognize the applicability to any tape container, including cassettes.

What is claimed is:

1. A cartridge comprising:
    a housing;
    at least one hub rotatably mounted within the housing;
    a length of data tape wound around the at least one hub; and
    a remotely accessible tag removably affixed to the interior of the housing, the remotely accessible tag operative to store data related to the cartridge, the remotely accessible tag readable by a remotely accessing reader placed in close proximity to the remotely accessible tag.

2. The cartridge of claim 1 wherein the housing defines an access door and wherein the remotely accessible tag is affixed to the access door.

3. The cartridge of claim 2 wherein the remotely accessible tag fits into tabs mounted on an inside surface of the access door.

4. The cartridge of claim 1 wherein the housing defines a slot into which the remotely accessible tag is inserted.

5. The cartridge of claim 4 wherein the remotely accessible tag is affixed to a carrier, the carrier having at least one tab which snaps into a mating region of the slot.

6. The cartridge of claim 1 wherein the remotely accessible tag may be written to and may be read from.

7. A system comprising:
    a cartridge encasing a length of data tape and a remotely accessible tag, the remotely accessible tag removably affixed to the interior of the data cartridge; and
    a tape drive operative to receive the cartridge and access the data tape, the tape drive having a remotely accessing receiver positioned such that, when the cartridge is inserted into the tape drive, the remotely accessing receiver can read data from the remotely accessible tag.

8. The system of claim 7 wherein the remotely accessing receiver is electrically connected to a printed circuit board pluggably removable from the tape drive.

9. The system of claim 7 wherein the remotely accessible tag stores data about the cartridge.

10. The system of claim 7 wherein the cartridge includes an access door permitting access to the data tape and wherein the remotely accessible tag is affixed to the access door.

11. The system of claim 10 wherein the tag fits into tabs mounted on an inside surface of the access door.

12. The system of claim 7 wherein the cartridge defines a slot into which the remotely accessible tag is inserted.

13. The system of claim 12 wherein the remotely accessible tag is affixed to a carrier, the carrier having at least one tab which snaps into a mating region of the slot.

14. The system of claim 7 wherein the remotely accessing receiver is operative to function as a transmitter thereby writing information into the remotely accessible tag.

* * * * *